US009466859B2

(12) United States Patent
Blanc et al.

(10) Patent No.: US 9,466,859 B2
(45) Date of Patent: Oct. 11, 2016

(54) DRYING PROCESS FOR COST EFFECTIVE PRODUCTION OF LI-ACCUMULATORS

(75) Inventors: Pierre Blanc, Morges (CH);
Karl-Heinz Pettinger, Garching (DE)

(73) Assignee: Leclanché SA, Yverdon-les-Bains (CH)

( * ) Notice: Subject to any disclaimer, the term of this patent is extended or adjusted under 35 U.S.C. 154(b) by 236 days.

(21) Appl. No.: 13/477,458

(22) Filed: May 22, 2012

(65) Prior Publication Data

US 2012/0317796 A1 Dec. 20, 2012

(30) Foreign Application Priority Data

Jun. 7, 2011 (GB) .................................. 1109510.6

(51) Int. Cl.
*H01M 10/0585* (2010.01)
*H01M 10/04* (2006.01)
*H01M 10/052* (2010.01)
*H01M 10/058* (2010.01)
*H01M 4/04* (2006.01)

(52) U.S. Cl.
CPC ..... *H01M 10/0585* (2013.01); *H01M 10/0404* (2013.01); *H01M 10/052* (2013.01); *H01M 10/058* (2013.01); *H01M 4/0471* (2013.01); *Y02E 60/122* (2013.01); *Y02P 70/54* (2015.11); *Y10T 29/4911* (2015.01); *Y10T 29/51* (2015.01)

(58) Field of Classification Search
None
See application file for complete search history.

(56) References Cited

U.S. PATENT DOCUMENTS 3,808,087 A * 4/1974 Milewski et al. .............. 428/86
4,249,316 A * 2/1981 Corse ............................. 34/475
4,430,397 A * 2/1984 Untereker ..................... 429/310
7,561,937 B2 * 7/2009 Reed et al. .................... 700/109
2002/0037457 A1 3/2002 Choi
2003/0190530 A1 * 10/2003 Yang et al. .................... 429/326
2005/0191545 A1 * 9/2005 Bowles ............... H01M 2/0207
429/127
2006/0143901 A1 * 7/2006 Tu ................................ 29/623.1
2007/0240299 A1 * 10/2007 Hasei ........................... 29/623.5

(Continued)

FOREIGN PATENT DOCUMENTS

CN 101435806 5/2009
CN 101989668 3/2011

(Continued)

OTHER PUBLICATIONS

Blake, Rick, "Conveyors Take Charge", Assembly Magazine, vol. Feb. 2011.*

(Continued)

*Primary Examiner* — Alix Eggerding
(74) *Attorney, Agent, or Firm* — 24IP Law Group; Timothy R DeWitt

(57) ABSTRACT

A method for manufacturing (large format) Lithium Battery packs, comprising the steps of providing one or more electrochemical cells, entering the one or more electrochemical cells into a pouch, partly sealing the pouch with the one or more electrochemical cells, entering the pouch with the one or more electrochemical cells into a drying oven, resting the pouch in the drying oven for a defined time, removing the pouch from the drying oven, transferring the dried pouches to an electrolyte filling station, filling the pouch with electrolyte and sealing the pouch wherein the manufacturing steps are performed under a normal manufacturing environment conditions, and only selected critical manufacturing steps are performed under dry room conditions.

7 Claims, 2 Drawing Sheets

(56) References Cited

U.S. PATENT DOCUMENTS

2009/0120163 A1* 5/2009 Takeda et al. ............... 73/23.35
2012/0156569 A1* 6/2012 Kia et al. ..................... 429/247

FOREIGN PATENT DOCUMENTS

| EP | 1 261 063 | 11/2002 |
| EP | 1 406 337 | 4/2004 |
| EP | 1406337 A1 * | 4/2004 |
| JP | 2009-123448 | 6/2009 |
| JP | 2011066324 A * | 3/2011 |
| RU | 2172541 | 8/2001 |
| RU | 22988264 | 4/2007 |

OTHER PUBLICATIONS

R. Blake, "Conveyors Take Charge," Assembly Magazine, vol. Feb. 2011.

* cited by examiner

DRYING PROCESS FOR COST EFFECTIVE PRODUCTION OF LI-ACCUMULATORS

BACKGROUND OF THE INVENTION

1. Field of the Invention

The present invention relates to the manufacturing of large format Lithium cells for battery packs.

2. Brief Description of the Related Art

It is a known problem in the manufacturing of Lithium cells for battery packs that the Lithium cells should contain only a minimum of water, as water leads to corrosion and side reactions which in turn can lead to a loss in performance of the respective cells, such as capacity loss, missing power capability, etc.

The water content in a Lithium cell should normally be less than 30 ppm. Generally, this is achieved by handling the materials and processes under strictly dry conditions. Machinery and materials are brought into dry rooms with reduced humidity. However, the construction and maintenance of full size dry rooms that are capable of receiving the necessary manufacturing equipment is very cost intensive.

Another problem with dry rooms is that the staff, necessary to operate the manufacturing machinery, must be able to enter and leave the dry room, without interfering with the dry room conditions, just as the material necessary for the manufacturing process must be brought into the dry room. The human body carries substantial quantities of humidity into those dry rooms. Once opened, e.g. for bringing in machinery, materials or people, it takes a long time to reach Lithium working conditions again, which is contra productive and makes the whole process very costly. Furthermore, the humidity can lead to difficulties in controlling the manufacturing processes and thus to lower grade products. It also leads to more difficult working conditions for employees who are exposed to extreme dry conditions for prolonged periods of time.

What has been proposed to solve the above mentioned problems is that materials for lithium cell manufacturing are pre-dried before they are brought into the dry rooms, which reduces the amount of humidity entered. However, this doesn't solve the general problem that arises from the fact that very large dry room volumes must be created and maintained.

Accordingly, there is still a need to provide a solution for the manufacturing of large format Lithium cells that effectively overcomes the above mentioned problems.

SUMMARY OF THE INVENTION

What is proposed is a method for manufacturing large format Lithium Battery packs, with the steps of assembling a stack of electrochemical cells, entering the assembled stack into a pouch, partly sealing the pouch with the stack of electrochemical cells, entering the pouch with the stack of electrochemical cells into a drying oven, resting the pouch in the drying oven for a defined time, transferring the dried pouches to an electrolyte filling station, filling the pouch with electrolyte and completely sealing the pouch, this method differing from the known state of the art in that the manufacturing steps are performed under normal manufacturing environment conditions, and only selected critical manufacturing steps are performed under dry room conditions, This method effectively allows manufacturing of large format Lithium cells that can be handled in a normal working environment, in which no dry rooms are necessary, as only critical parts of the manufacturing process are kept under dry room conditions with the dry room environment restricted to selected machines only, such as the drying oven and/or the electrolyte filling station, which is kept under inert gas or dried air.

Preferably the defined fraction of manufacturing steps consists in entering into, resting within, and transferring the pouch from the drying oven, but it may also include the filling of the pouch with electrolyte. The drying oven has a temperature range of up to 200° C., but is typically kept at 120° C. The pressure range is 0-400 mbar abs., with typically 50 mbar abs., constant or variable. Finally, the drying time ranges from 1 h to 100 hrs., but remains typically between 12 hrs and 48 hrs.

Under those conditions the water, which can be adhesive water, porous or crystalline water will diffuse out of the cells.

The oven may consist of a central chamber that is constructed for vacuum technology. Its shape is irrelevant. The concept can be modular. For bringing the cells in and out of the drying oven, two airlocks may be provided.

Within the drying oven the cells may be stored in any convenient way and may be moved during drying or not.

For transferring the pouch from the drying oven to the filling station a tunnel under dry room conditions may be used.

In another preferred embodiment, the pouches may be moved continuously through the manufacturing process.

It may be pointed out that water extraction is a particular problem with large format Lithium cells, because water extraction becomes increasingly difficult with large cell formats.). A large format Lithium cell may be considered a lithium cell with dimension of about 10 cm or more in at least one dimension. The dimension may be much larger. A typical example of a large format Lithium cell may have dimension corresponding to DIN A5 format or larger, but possible formats are not limited to a specific length to width ration. A large format Lithium cell typically comprises at least two electrodes, an anode and a cathode and a separator arranged between the anode and the cathode. In bi-cell configuration, a large format Lithium cell typically comprises one double sided anode, two separators arranged on both sides of the anode and two cathodes or one double sided cathode, two separators arranged on both sides of the cathode and two anodes. Each electrode comprises a collector, for example in the form of a metal foil and an active electrode material. A large variety of collector materials, of active electrode materials and of separator materials is known in the art. The invention is not limited to a specific material or material combination. The width of the gap between the collectors is typically less than 1 mm. The typical lateral diffusion distance from the middle of the electrode to the edge is between 10 and 20 cm. The target is to have the cell in a homogeneous dry state.

For enhanced drying a special "pumping the water vapour out of the cell" effect can be applied. Pressure changes are applied in the oven. For example the pressure is reduced to 200 mbar abs. After a certain time there will be an equilibrium related to the water vapour pressure in the structure. A certain part is diffusing out of the cell, even though this is a slow process. To enhance the transport of water, the pressure in the oven is reduced and water vapour is transported out of the cell. The repetition of this cycle leads to a gradually lower water content in the cell.

Furthermore, the drying process must not lead to complete drying at all. A little rest of water may remain in the cell with. This can be e.g. 300 ppm. This residual water is being quenched out to a value <30 ppm later on by filling in electrolyte.

The method as proposed can be used for any material in Lithium battery-technology, including any anode material, any cathode material, any separator material and any electrolyte applicable in lithium battery technology.

BRIEF DESCRIPTION OF THE DRAWINGS

Further features and characteristics may be taken from the following non-limiting description of preferred embodiments of the method and the drying oven used therein, with reference to the enclosed figures, showing in.

DETAILED DESCRIPTION

Figure 1:
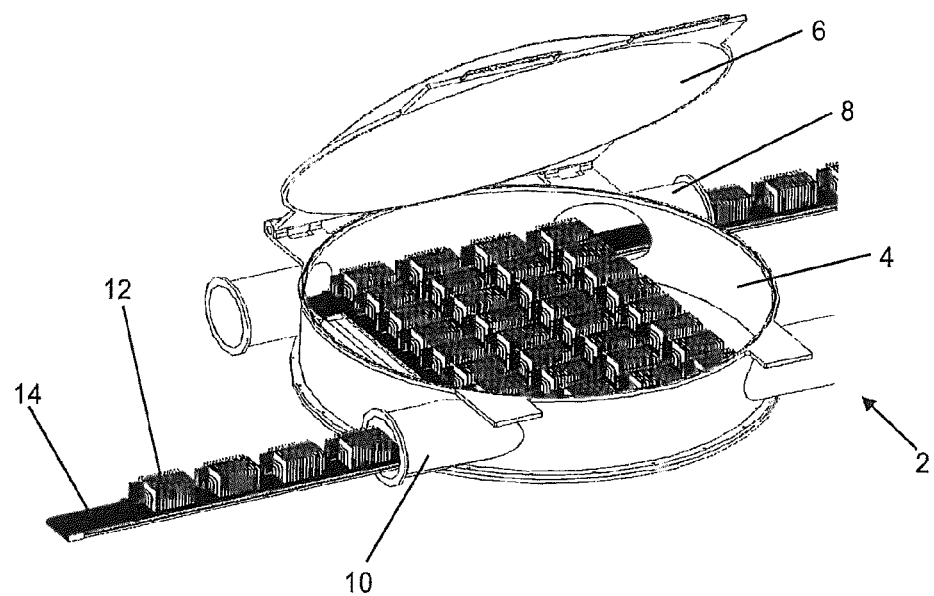
FIG. 1 The schematic view of a round vacuum drying oven.

In FIG. 1 the schematic view of a round vacuum drying oven 2 is shown, with an oven barrel 4 that is closed at the bottom but open at the top, and an oven lid 6, to close the oven barrel 4 in an airtight manner.

In the background, an inlet tube 8 is shown and in the foreground a similar outlet tube 10, through which trays (not shown) with Lithium battery cells 12 can enter the oven barrel 4. In this particular embodiment, the rays with the battery cells are moved in an out of the oven barrel on a continuous moving belt 14, which could of course be replaced by any other means for moving the battery cells in and out of the oven 2.

The large format Lithium battery cells of FIG. 1 that are being moved into and out of the oven 2, comprise and stack of electrodes that have been entered into a pouch, which is partly sealed when entering the drying oven 2.

In the embodiment shown in FIG. 1., partly sealed pouches with electrode stacks that form the battery cells, are slowly moved between the moving belt 14 entering the oven 2 through the inlet tube 8, and the belt 14, leaving the oven through the outlet tube 10 in a time controlled manner at a temperature of 120° C., a pressure of 50 mbar abs., which can be constant or variable, for a drying time between 12 hrs and 48 hrs.

Figure 2:
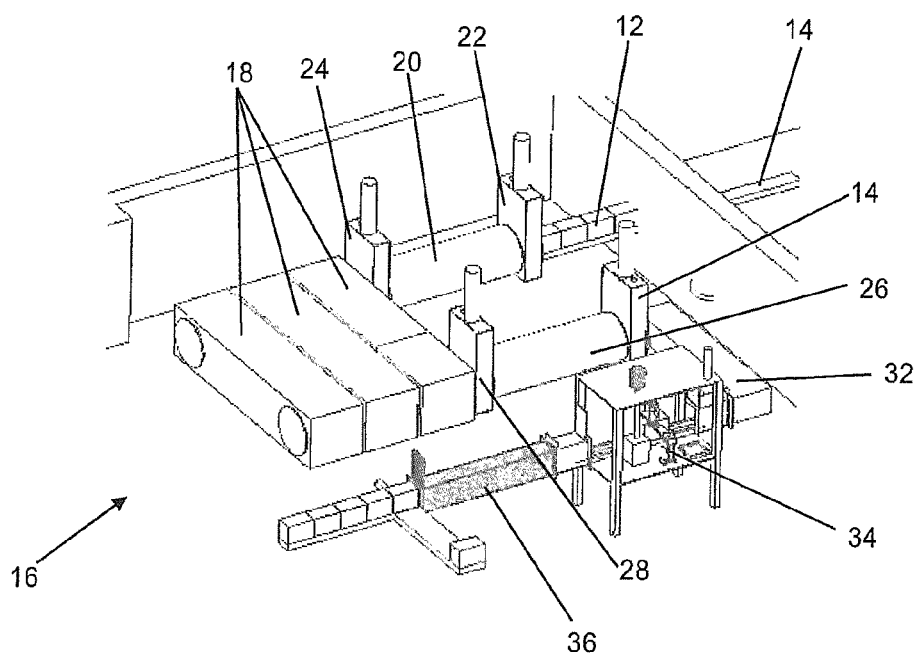
FIG. 2 The schematic view of a modular concept for a drying oven, with vacuum tubes.

In FIG. 2 the schematic view of a modular concept for a drying oven 16, consisting of vacuum tubes 18 is shown. As can be seen in the background of FIG. 2, the battery cells 12 are again moved on moving belts 14 into the oven 16, i.e. the vacuum tubes 18, via an inlet lock 20 that has an entrance gate 22 and an exit gate 24. The battery cells 12 are then moved through the vacuum tubes 18 of the oven 16 for a defined time, as described above with reference to FIG. 1 already, and leave the oven through another outlet lock 26, having an entrance gate 28 and an exit gate 30.

From the exit gate 30, the dried battery cells are moved through a transfer tunnel 32, which is kept under a dry atmosphere by means of an inert gas or dry air, to an Electrolyte Filling Station 34, which in the embodiment shown in FIG. 2 is a glass compartment that is kept under dry atmosphere as well.

From this Electrolyte Filling Station 34, the battery cells move into a handling station 36.

In the setup of FIG. 2 only the oven 16, the transfer tunnel 32 and the Electrolyte Filling Station 34 are kept under dry room conditions so that there is no need anymore to construct full size dry rooms in which the battery packs are manufactured.

What is claimed is:

1. A method for assembling a Lithium Battery pack, wherein said Lithium Battery pack comprises a plurality of lithium cells, each said lithium cell having a dimension of about 10 cm or more, comprising the steps of:
    entering one or more of said plurality of lithium cells into a pouch;
    partly sealing the pouch with the one or more lithium cells;
    entering the pouch with the one or more lithium cells into a drying oven;
    resting the pouch in the drying oven for a defined time;
    removing the pouch from the drying oven;
    transferring the dried pouch through a transfer tunnel to an electrolyte filling station;
    filling the pouch with electrolyte; and
    sealing the pouch,
    wherein only selected critical assembly steps are performed under dry room conditions and assembly steps other than the selected critical assembly steps are performed under environment conditions other than dry room conditions;
    wherein the selected critical manufacturing steps consist of the steps of entering, resting and removing the pouch from the drying oven, transferring the dried pouches through a transfer tunnel to an electrolyte filling station and filling the pouch with electrolyte, and wherein each one of the dry room conditions in the drying oven, transfer tunnel, and electrolyte filling station is kept separately from each other for performing the selected critical assembly steps.

2. The method according to claim 1, wherein the pouches are moved continuously through the manufacturing process.

3. The method according to claim 1, wherein the dry room conditions are maintained by means of a dry gas or dry air.

4. The method according to claim 1, wherein the drying oven is kept under vacuum and wherein the steps of entering the pouch into and removing the pouch from the drying oven is performed through respective air-locks.

5. The method according to claim 1, wherein each one of the one or more lithium cells comprises at least two electrodes and at least one separator.

6. The method according to claim 4, wherein the vacuum within the drying oven is varied over the time that the pouch rests within the oven, to achieve a pumping effect.

7. A method for assembling a Lithium Battery pack, wherein said Lithium Battery pack comprises a plurality of lithium cells, each said lithium cell having a dimension of about 10 cm or more, comprising the steps of:
    entering one or more of said plurality of lithium cells into a pouch;
    partly sealing the pouch with the one or more lithium cells;
    entering the pouch with the one or more lithium cells into a drying oven;
    resting the pouch in the drying oven for a defined time;
    removing the pouch from the drying oven;
    transferring the dried pouch through a transfer tunnel to an electrolyte filling station;
    filling the pouch with electrolyte; and
    sealing the pouch;
    wherein only selected critical assembly steps are performed under dry room conditions and assembly steps other than the selected critical assembly steps are performed under environment conditions other than dry room conditions; and wherein the selected critical manufacturing steps consist of the steps of entering, resting and removing the pouch from the drying oven, and wherein each one of the dry room conditions in the drying oven, transfer tunnel, and electrolyte filling station is kept separately from each other for performing the selected critical assembly steps.

* * * * *